US012748181B2

(12) United States Patent
Saito

(10) Patent No.: US 12,748,181 B2
(45) Date of Patent: Sep. 29, 2026

(54) RADAR DEVICE AND VEHICLE INCLUDING SAME

(71) Applicant: Murata Manufacturing Co., Ltd., Nagaokakyo (JP)

(72) Inventor: Ryo Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 307 days.

(21) Appl. No.: 18/401,732

(22) Filed: Jan. 2, 2024

(65) Prior Publication Data

US 2024/0183940 A1 Jun. 6, 2024

Related U.S. Application Data

(63) Continuation of application No. PCT/JP2022/025854, filed on Jun. 28, 2022.

(30) Foreign Application Priority Data

Jul. 5, 2021 (JP) ................................ 2021-111830

(51) Int. Cl.
*G01S 7/35* (2006.01)
*G01S 7/03* (2006.01)
*G01S 13/42* (2006.01)

(52) U.S. Cl.
CPC ................ *G01S 7/352* (2013.01); *G01S 7/03* (2013.01); *G01S 13/42* (2013.01)

(58) Field of Classification Search
CPC . G01S 7/352; G01S 7/03; G01S 13/42; G01S 13/88; G01S 7/354; G01S 7/415
USPC .......................................................... 342/195
See application file for complete search history.

(56) References Cited

U.S. PATENT DOCUMENTS 5,717,399 A * 2/1998 Urabe ...................... H01Q 3/24 342/87
5,943,214 A * 8/1999 Sato ....................... H02K 11/40 361/809
7,339,518 B2 * 3/2008 Natsume ............... G01S 13/345 342/111
(Continued)

FOREIGN PATENT DOCUMENTS

EP 3060940 B1 * 8/2021 ............. G01S 13/34
JP 53142891 U * 4/1977
(Continued)

OTHER PUBLICATIONS

International Search Report and Written Opinion mailed on Aug. 2, 2022, received for PCT Application PCT/JP2022/025854, filed on Jun. 28, 2022, 8 pages including English Translation.

*Primary Examiner* — Nuzhat Pervin
(74) *Attorney, Agent, or Firm* — XSENSUS LLP

(57) ABSTRACT

A radar device that includes a radar module and a vibrator. An example of the vibrator is an actuator, which generates vibration with a magnitude smaller than the range resolution of the radar device. A shield case is supported on a bracket with a fixing portion interposed therebetween. The fixing portion is made of an elastic material. As the actuator vibrates, the shield case vibrates irregularly, and the vibration of the shield case is transmitted to a circuit board. On the front side of the circuit board, a pattern constituting an array antenna is formed.

20 Claims, 10 Drawing Sheets

(56) References Cited

U.S. PATENT DOCUMENTS

| | | | | |
|---|---|---|---|---|
| 8,207,887 | B2 * | 6/2012 | Goldman | G01S 13/9029 342/159 |
| 9,470,784 | B2 * | 10/2016 | Kishigami | G08G 1/056 |
| 9,618,616 | B2 * | 4/2017 | Kishigami | G01S 7/40 |
| 9,664,777 | B2 * | 5/2017 | Kishigami | G01S 7/023 |
| 10,317,518 | B2 * | 6/2019 | Warnick | G01S 13/42 |
| 10,408,920 | B2 * | 9/2019 | Kurono | G01S 13/584 |
| 10,481,251 | B2 * | 11/2019 | Ishimori | G01S 13/524 |
| 10,698,105 | B2 * | 6/2020 | Aoki | G01S 13/42 |
| 10,739,438 | B2 * | 8/2020 | Harrison | G01S 13/726 |
| 10,914,819 | B2 * | 2/2021 | Longman | G01S 13/343 |
| 11,009,598 | B2 * | 5/2021 | Dobrev | G01S 13/87 |
| 11,347,218 | B2 * | 5/2022 | Wang | H04W 4/44 |
| 2012/0169532 | A1 * | 7/2012 | Yamada | G01S 13/87 342/25 R |
| 2014/0062763 | A1 * | 3/2014 | Kishigami | G01S 3/74 342/158 |
| 2016/0238694 | A1 * | 8/2016 | Kishigami | G01S 7/0233 |
| 2017/0082744 | A1 * | 3/2017 | Matsumoto | G01S 7/352 |
| 2017/0146648 | A1 * | 5/2017 | Lim | G01S 13/584 |
| 2019/0219669 | A1 * | 7/2019 | Iida | G01S 3/46 |
| 2020/0011968 | A1 * | 1/2020 | Hammes | G01S 13/931 |
| 2020/0103522 | A1 * | 4/2020 | Singh | B60R 19/483 |
| 2020/0211337 | A1 * | 7/2020 | Grant | G08B 25/10 |
| 2021/0063558 | A1 * | 3/2021 | Higuchi | G01S 13/34 |
| 2021/0109193 | A1 * | 4/2021 | Tsutsumi | G01S 13/343 |
| 2021/0116536 | A1 * | 4/2021 | Brosche | G01S 13/343 |
| 2021/0181329 | A1 * | 6/2021 | Kashiwagi | G01S 13/343 |
| 2021/0197834 | A1 * | 7/2021 | Shaker | G06V 40/25 |
| 2021/0349183 | A1 * | 11/2021 | Lee | G01S 7/40 |
| 2022/0105667 | A1 * | 4/2022 | Umezawa | B29C 45/1615 |
| 2022/0123458 | A1 * | 4/2022 | Yanagi | B60R 13/005 |
| 2022/0187158 | A1 * | 6/2022 | Peng | G01H 9/002 |
| 2022/0268877 | A1 * | 8/2022 | Uchida | G01S 7/006 |
| 2022/0286589 | A1 * | 9/2022 | Kim | B60Q 1/2692 |
| 2022/0299628 | A1 * | 9/2022 | Chang | G01S 13/825 |
| 2022/0363258 | A1 * | 11/2022 | Voigt | B60W 30/12 |
| 2023/0139564 | A1 * | 5/2023 | Ito | G01S 7/4047 342/175 |
| 2023/0204751 | A1 * | 6/2023 | Shimizu | G01S 13/42 342/107 |
| 2024/0162630 | A1 * | 5/2024 | Ma | H01Q 21/065 |
| 2025/0098967 | A1 * | 3/2025 | Murakami | A61B 5/024 |
| 2025/0248331 | A1 * | 8/2025 | Merkt | A01D 34/661 |

FOREIGN PATENT DOCUMENTS

| | | | | | |
|---|---|---|---|---|---|
| JP | S53-142891 | A | | 12/1978 | |
| JP | 2017090229 | A | * | 5/2017 | G01S 7/02 |
| JP | 2019070558 | A | * | 5/2019 | G01S 3/46 |
| WO | WO-2020026916 | A1 | * | 2/2020 | G01S 13/4463 |

* cited by examiner (a)

(b)

RADAR DEVICE AND VEHICLE INCLUDING SAME

CROSS-REFERENCE TO RELATED APPLICATIONS

This is a continuation application of PCT/JP2022/025854, filed on Jun. 28, 2022, designating the United States of America, which is based on and claims priority to Japanese Patent Application No. JP 2021-111830 filed on Jul. 5, 2021. The entire contents of the above-identified applications, including the specifications, drawings and claims, are incorporated herein by reference in their entirety.

TECHNICAL FIELD

The present disclosure relates to a radar device including a radar module that calculates directions of arrival of signals from two or more stationary targets and to a vehicle including the radar device.

BACKGROUND ART

One radar device of this type in the related art is disclosed in Patent Document 1, for example.

In this radar device, the signal processing unit includes an extension calculator and an azimuth calculator. The extension calculator acquires a signal of each antenna based on a reception signal received by an array antenna and generates a correlation matrix based on the acquired signals of the respective antennas. Then, using the generated correlation matrix, the extension calculator generates an extended correlation matrix by using the Khatri-Rao product and performs spatial smoothing for the generated extended correlation matrix to generate a spatially-smoothed extended correlation matrix. The azimuth calculator calculates, based on the spatially-smoothed extended correlation matrix generated by the extension calculator, directions of arrival of signals from targets that are included in the reception signal.

In this radar device, array extension is implemented by generating the extended correlation matrix by using the Khatri-Rao product to virtually increase the number of reception antennas.

CITATION LIST

Patent Document

Patent Document 1: Japanese Unexamined Patent Application Publication No. 2017-90229

SUMMARY OF DISCLOSURE

Technical Problem

The radar device of the related art that is disclosed in Patent Document 1 generates the spatially-smoothed extended correlation matrix, and thus the correlation component between reception signals can be reduced by spatial smoothing but cannot be sufficiently removed. Therefore, based on two or more stationary targets being located at similar distances, it is difficult for the aforementioned radar device of the related art to estimate the azimuth of each target with a high degree of accuracy.

Solution to Problem

The present disclosure was made to solve the aforementioned problem and provides a radar device including:

a radar module that performs array extension using an extended correlation matrix to virtually increase the number of reception antennas and calculates directions of arrival of signals from two or more stationary targets; and a vibration applying structure that irregularly applies, to the radar module, vibration with a magnitude smaller than the radar range resolution.

In a radar device using array extension, extension signals of virtual antenna elements constituting elements of the extended correlation matrix by using the Khatri-Rao product each have a cross-correlation component between reception signals. The cross-correlation component is represented by an exponential function in which the base is e and the exponent contains absolute phases of two or more targets. Based on the two or more targets whose positions are to be determined being stationary, the absolute phase of each target does not change, and the cross-correlation component between reception signals maintains a constant value. It is therefore difficult to identify each target and identify the azimuth thereof.

According to the configuration of the present disclosure, the vibration applying structure irregularly applies, to the radar module, vibration with a magnitude smaller than the radar range resolution, and the distance between the radar device and each of the two or more stationary targets fluctuates irregularly. On the other hand, the absolute phase of each target is proportional to the distance between the radar device and the target. Based on the radar device transmitting and receiving positioning signals for several times while the vibration applying structure is irregularly applying, to the radar module, vibration with a magnitude smaller than the radar range resolution, the absolute phase of each target changes randomly at each measurement. Therefore, the cross-correlation component that is contained in the extension signal obtained at each measurement and is expressed by an exponential function has varying values. Averaging the obtained extension signals can remove the cross-correlation component.

The present disclosure further provides a vehicle including the aforementioned radar device.

Advantageous Effects of Disclosure

According to the present disclosure, it is therefore possible to provide a radar device that is able to identify two or more stationary targets located in similar positions and measure the azimuth of each target with a high degree of accuracy without being affected by a cross-correlation component between reception signals and to provide a vehicle including the radar device.

DESCRIPTION OF EMBODIMENTS

Next, modes for carrying out a radar device of the present disclosure and a vehicle including the radar device will be described.

Figure 1:
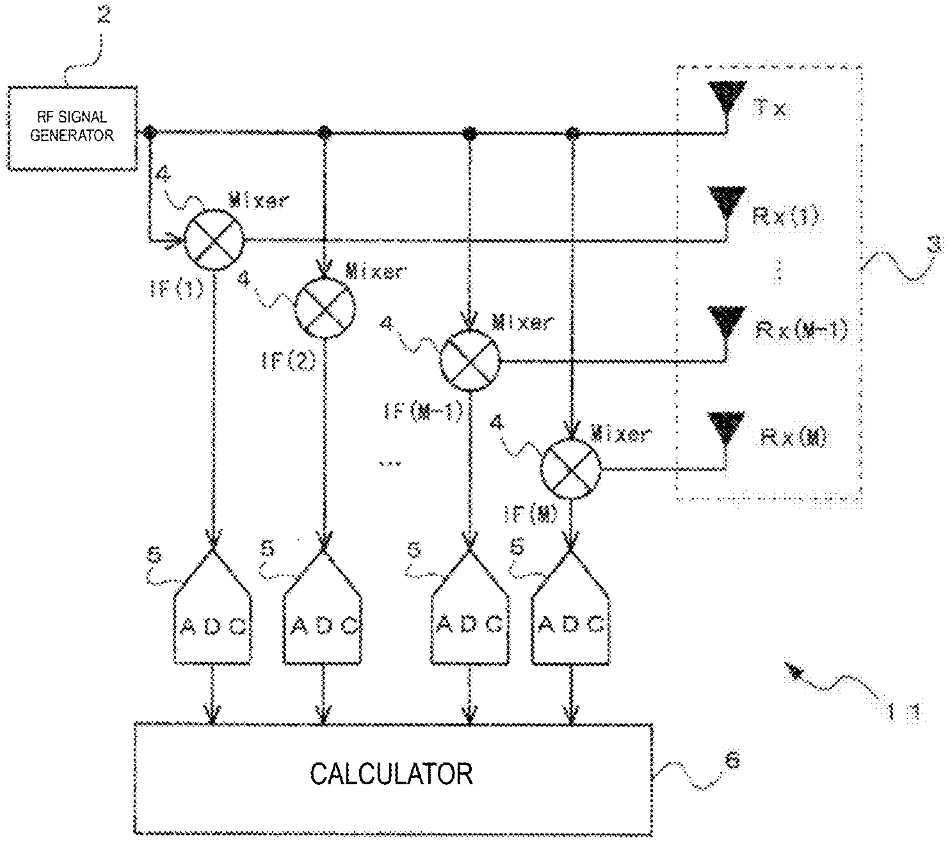
FIG. 1 is a block diagram illustrating a schematic configuration of a radar module constituting a radar device according to an embodiment of the present disclosure.

FIG. 1 is a block diagram illustrating a schematic configuration of a radar module 11, which constitutes a frequency modulated continuous wave (FMCW) radar device 1 according to an embodiment of the present disclosure.

The radar module 11 includes a radio frequency (RF) signal generator 2, an array antenna 3, mixers 4, analog-to-digital converters (ADCs) 5, and a calculator 6.

Figure 2:
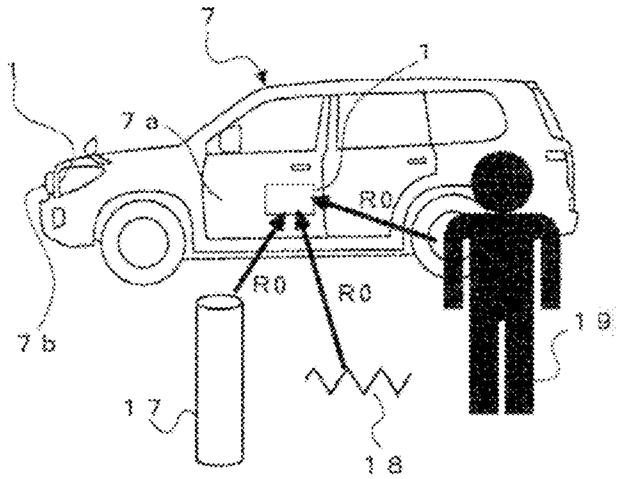
FIG. 2 is a perspective view of a vehicle in which the radar device according to the embodiment is mounted.

FIG. 2 is a perspective view of a vehicle 7, which includes the FMCW radar device 1. The FMCW radar device 1 is provided within a side door 7*a* of the vehicle 7, behind an emblem 7*b*, within a door handle, behind or within a bumper, behind a chassis or a grille, within a back door of the vehicle 7, or in another proper place. The FMCW radar device 1 is hidden by the exterior of the vehicle body.

Figure 3:
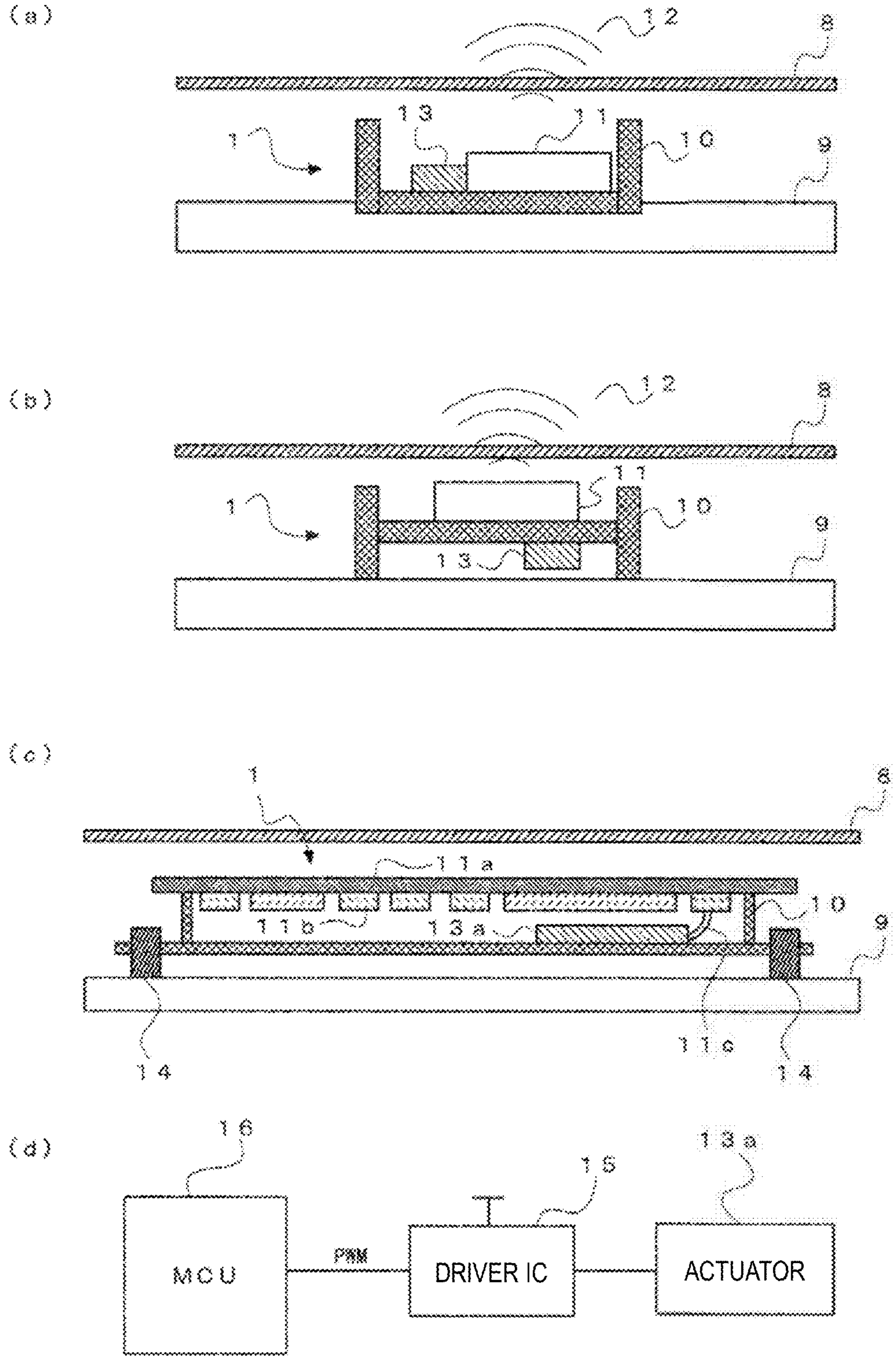
FIG. 3 is a diagram describing a vibration applying structure constituting the radar device according to the embodiment.

In the embodiment, as conceptually illustrated in FIGS. 3(*a*) and 3(*b*), the FMCW radar device 1 is constructed on a bracket 9 behind an exterior 8 of the vehicle body such that the radar module 11 is mounted on a shield case 10 together with a vibrator 13. The FMCW radar device 1 includes the radar module 11 and the vibrator 13, and the radar module 11 transmits a transmission wave 12 from behind the exterior 8. FIG. 3(*a*) illustrates a vibration applying structure of the FMCW radar device 1 in which the radar module 11 is provided next to the vibrator 13 on the surface of the shield case 10. FIG. 3(*b*) illustrates another vibration applying structure of the FMCW radar device 1 in which the radar module 11 is provided on the front side of the shield case 10 while the vibrator 13 is provided on the back side of the shield case 10. These vibration applying structures are configured to randomly apply vibration generated by the vibrator 13 to the radar module 11. The vibrator 13 generates vibration with a magnitude smaller than the range resolution of the FMCW radar device 1.

FIG. 3(*c*) is a diagram illustrating a specific example of the vibration applying structure of the FMCW radar device 1. In this specific example, the vibrator 13 is a thin power-saving linear resonance actuator 13*a*. The shield case 10 is supported on the bracket 9 with fixing portions 14 interposed therebetween. The fixing portions 14 are each composed of a moving component or an elastic material such as an elastic body. In response to vibration of the linear resonance actuator 13*a*, the shield case 10 vibrates. The vibration of the shield case 10 is transmitted to a circuit board 11*a*, which constitutes the radar module 11. In the surface of the circuit board 11*a* that faces the exterior 8, a pattern constituting the array antenna 3 is formed. In the surface of the circuit board 11*a* on the opposite side from the exterior 8, various electronic components 11*b*, which constitute the radar module 11, are mounted. The linear resonance actuator 13*a*, which is provided on the shield case 10, is electrically coupled to the electronic components 11*b* via a cable 11*c*.

FIG. 3(*d*) illustrates a driving circuit for the linear resonance actuator 13*a*. The linear resonance actuator 13*a* is coupled to a driver IC 15, which operates upon being powered at a predetermined voltage. The driver IC 15 is coupled to a microcontroller unit (MCU) 16, which integrally controls the radar module 11. The MCU 16 controls the driver IC 15 by a pulse width modulation (PWM) method to control the resonance frequency of vibration to be generated by the linear resonance actuator 13*a*, so that vibrations with various magnitudes can be irregularly generated. In the description herein, the vibrator 13 is the linear resonance actuator 13*a* by way of example. The vibrator 13 is not limited to this and can be an eccentric rotating mass (ERM) motor, a piezoelectric element, or the like, for example.

Figure 4:
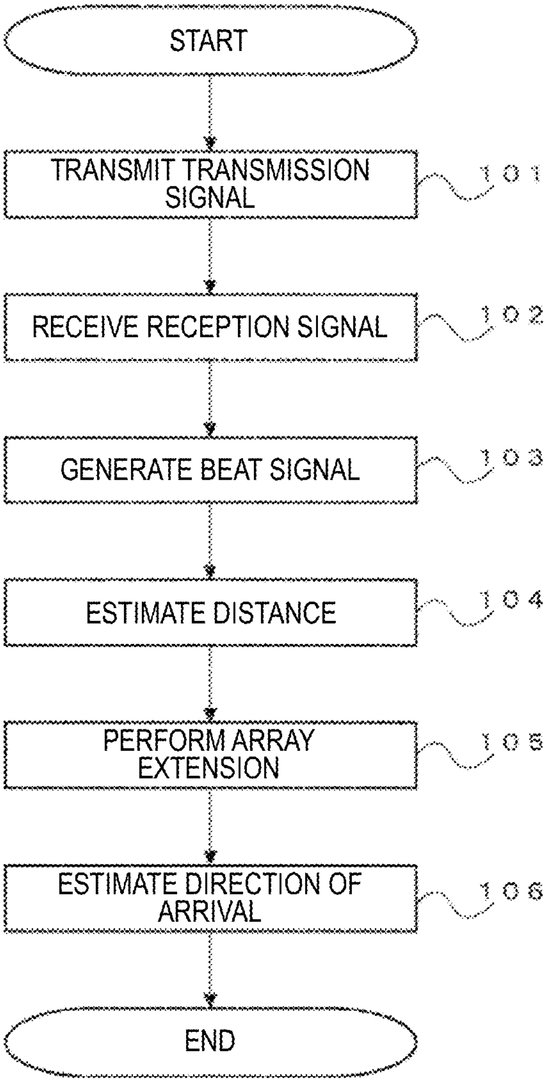
FIG. 4 is a flowchart illustrating an operation of the radar device according to the embodiment.

FIG. 4 is a flowchart illustrating the operation of the radar module 11 executed by the MCU 16.

Under control by the MCU 16, the radar module 11 first transmits a transmission signal (see step 101 in FIG. 4). The RF signal generator 2 illustrated in FIG. 1 is a signal generator capable of varying the signal frequency with time and generates a chirp signal as a transmission signal. The array antenna 3 includes a transmission antenna Tx and reception antennas Rx(1), . . . , Rx(M−1), and Rx(M). Herein, M is a natural number, and the same applies hereinafter. The transmission antenna Tx transmits a transmission signal wave corresponding to the transmission signal generated by the RF signal generator 2. The radar module 11 then receives a reception signal (see step 102 in FIG. 4). The reception antennas Rx(1), . . . , Rx(M−1), and Rx(M) receive as a reception signal wave, a reflected wave that results from reflection of the transmission signal wave transmitted from the transmission antenna Tx off a target and returns to the array antenna 3.

Figure 5:
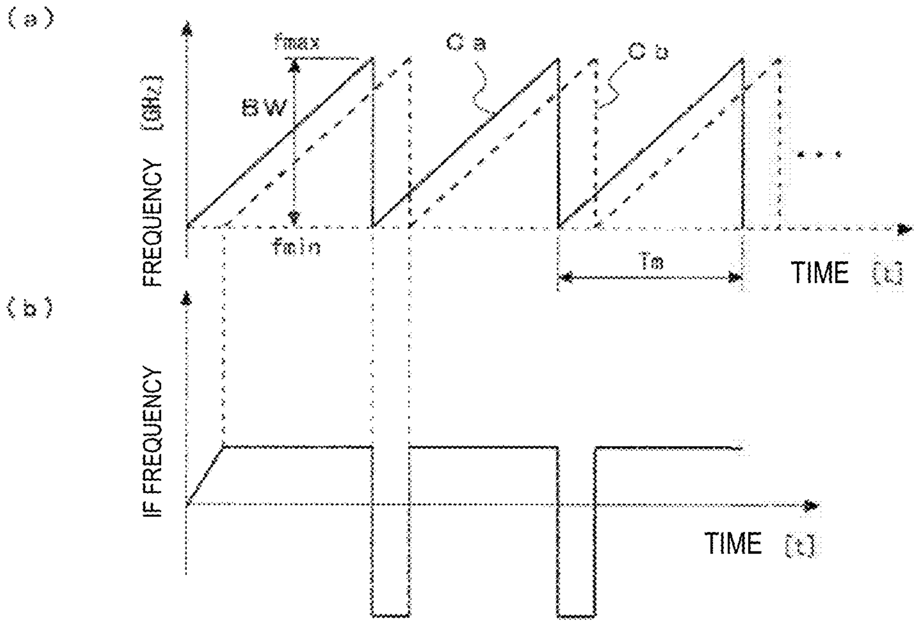
FIG. 5 includes a graph describing signals transmitted and received by the radar device according to the embodiment and a graph describing a signal calculated by the radar device.

FIG. 5(*a*) is a graph illustrating waveforms of a chirp signal Ca of the transmission wave transmitted from the transmission antenna Tx and a chirp signal Cb of the reflected wave received by the reception antennas Rx. The horizontal axis of the graph is time [t], and the vertical axis is frequency [GHz]. The chirp signal Ca of the transmission wave is indicated by a solid line, and the chirp signal Cb of the reflected wave is indicated by a dashed line. Each of the chirp signals Ca and Cb has a band width BW, which is a frequency difference between a maximum frequency $f_{max}$ and a minimum frequency $f_{min}$, and a duration $T_m$.

Next, the radar module 11 generates a beat signal (see step 103 in FIG. 4). The mixers 4 each multiply the transmission signal by the reception signal for the corresponding reception antenna Rx of the array antenna 3 to generate intermediate frequency (IF) signals (IF signals) IF(1), . . . , IF(M−1), and IF(M), thus generating the IF signal as a beat signal from the difference in frequency between the transmission signal and the reception signal. FIG. 5(*b*) is a graph illustrating this IF signal. The horizontal axis of the graph is time [t], and the vertical axis is IF frequency [GHz].

The aforementioned transmission signal and reception signals are indicated by $V_{tx}$ and $V_{rx}$ in Expressions (1) and (2) below, respectively. Herein, $A_{tx}$ and $A_{rx}$ are amplitudes of the transmission signal $V_{tx}$ and the reception signal $V_{rx}$; $\omega_{tx}$ is the angular frequency of the chirp signal Ca; R is the distance to a target; c is the speed of light; and $\phi 1$ is an initial phase.

[Math. 1]

$$V_{tx} = A_{tx}\cos(\omega_{tx}t + \phi_1) \quad (1)$$

$$V_{rx} = A_{rx}\cos\left[\omega_{tx}\left(t - \frac{2R}{c}\right) + \phi_1\right] \quad (2)$$

The chirp signal Ca is represented as $f_{tx}$ in Expression (3) below using the band width BW, the duration $T_m$, and the minimum frequency $f_{min}$.

[Math. 2]

$$f_{tx} = \frac{BW}{T_m}t + f_{min} \quad (3)$$

The IF signal is represented as $V_{IF}$ in Expression (4) below based on Expressions (1) to (3). The ADCs 5 each convert the inputted IF signal from an analog signal to a digital signal and outputs the resultant signal to the calculator 6.

[Math. 3]

$$V_{IF} = \frac{A_{tx}\cdot A_{rx}}{2}\cos 2\pi\left[\underbrace{\frac{2R\cdot BW}{c\cdot Tm}}_{\text{IF Frequency}}t + \underbrace{\frac{2R\cdot f_{min}}{c}}_{\text{Phase }\alpha}\right] \quad (4)$$

In Expression (4), the coefficient of the time t represents the IF frequency $f_{if}$, and the constant is the absolute phase α of the target. The distance R to the target is calculated by Expression (5) below from the IF frequency $f_{if}$. The radar module 11 performs processing to estimate the distance R to the target by using Expression (5) in the calculator 6 (see step S104 in FIG. 4).

[Math. 4]

$$R = \frac{c\cdot Tm}{2BW}f_{if} \quad (5)$$

The radar module 11 then performs arithmetic processing of array extension in the calculator 6 (see step 105 in FIG. 4). The calculator 6 performs discrete Fourier transform for the IF signal represented in Expression (4). The calculator 6 assumes that the target exists at a distance corresponding to the frequency with high power in the IF signal that was subjected to discrete Fourier transform and acquires phase information and amplitude information of the frequency component at that distance for each reception antenna Rx. The calculator 6 creates a vector X represented by Expression (6) below by setting as its elements, signals $x_1$, $x_2$, . . . , $x_{M-1}$, and $x_M$ including the phase information and the amplitude information of the distance at which the target is assumed to exist.

[Math. 5]

$$X = \begin{bmatrix} x_1 \\ x_2 \\ \vdots \\ x_{M-1} \\ x_M \end{bmatrix} = [x_1, x_2, \ldots, x_{M-1}, x_M]^T \quad (6)$$

Next, from a transpose vector $X^T$, which is the transpose of the vector X and is represented by Expression (7) below, the calculator 6 calculates the complex conjugate of the transpose vector $X^T$ as a Hermitian transpose vector $X^H$, which is represented by Expression (8) below. Herein, x* is the complex conjugate of the reception signal x.

[Math. 6]

$$X^T = [x_1, x_2, \ldots, x_{M-1}, x_M] \quad (7)$$

$$X^H = [x_1^*, x_2^*, \ldots, x_{M-1}^*, x_M^*] \quad (8)$$

Next, from the vector X, which is represented by Expression (6), and the Hermitian transpose vector $X^H$, which is represented by Expression (8), the calculator 6 generates a correlation matrix $XX^H$ based on the acquired reception signal. Using the generated correlation matrix $XX^H$, the calculator 6 generates an extended correlation matrix $R_{xx}$ by using the Khatri-Rao product, which is represented by Expression (9) below. Herein, E $[XX^H]$ means an expectation of the correlation matrix $XX^H$.

[Math. 7]

$$R_{xx} = E[XX^H] = \begin{bmatrix} R_{11} & R_{12} & \ldots & R_{1M} \\ R_{21} & R_{22} & \ldots & R_{2M} \\ \vdots & \vdots & \ddots & \vdots \\ R_{M1} & R_{M2} & \ldots & R_{MM} \end{bmatrix} \quad (9)$$

Figure 6:
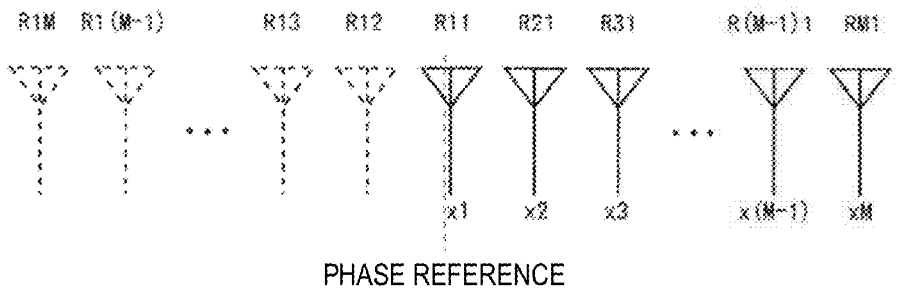
FIG. 6 is a diagram describing reception antennas subjected to array extension in the radar device according to the embodiment.

Each element $R_{ij}=x_i x_j^H$ of the extended correlation matrix $R_{xx}$, which is expressed by Expression (9), is an extension signal equivalent to the reception signal of a virtual antenna located at the position of the difference between the i-th reception antenna Rx and the j-th reception antenna Rx. In the case of the array antenna 3, which is linearly arranged, as illustrated in FIG. 6, based on an array extension being applied to the signals $x_1$, $x_2$, . . . , $x_{M-1}$, and $x_M$ of the frequency component corresponding to the target that are extracted from the IF signals, extension signals $R_{11}$, $R_{21}$, $R_{31}$, . . . , $R_{(M-1)1}$, and $R_{M1}$ of reception antenna elements that are arranged linearly and are indicated by solid lines are generated at the same positions as the signals $x_1$, $x_2$, . . . , $x_{M-1}$, and $x_M$, and extension signals $R_{12}$, $R_{13}$, . . . , $R_{1(M-1)}$, and $R_{1M}$ of virtual antenna elements are generated at positions indicated by dashed lines based on a phase reference. The number of reception antenna elements is thus increased from M to 2M−1.

By way of example, the extension signal $R_{21}$ that produces the extension signal $R_{12}$ of the virtual antenna element appearing at the position of the difference between the first and second antenna elements is expanded like Expression (10) below based on two reflected waves arriving. Herein, A1 is the amplitude of the reflected wave from a target a in the first antenna element, and A2 is the amplitude of the reflected wave from a target b in the first antenna element. α1 is the absolute phase of the reflected wave from the target a in the first antenna element, and α2 is the absolute phase of the reflected wave from the target b in the first antenna element. w1 is the amount of phase rotation of the reflected wave from the target a in the second antenna element, and w2 is the amount of phase rotation of the reflected wave from the target b in the second antenna element.

[Math. 8]

$$
\begin{aligned}
R_{21} &= x_2 x_1^* \qquad (10)\\
&= \left(A_1 e^{j(\alpha_1+w_1)} + A_2 e^{j(\alpha_2+w_2)}\right)\left(A_1 e^{-j\alpha_1} + A_2 e^{-j\alpha_2}\right) \quad \text{CORRELATION COMPONENT}\\
&= A_1^2 e^{jw_1} + A_2^2 e^{jw_2} + \boxed{A_1 A_2 e^{j(\alpha_1+w_1-\alpha_2)} + A_1 A_2 e^{j(\alpha_2+w_2-\alpha_1)}}
\end{aligned}
$$

Next, based on the reception antennas that have virtually increased in number by the aforementioned array extension using the extended correlation matrix, the calculator 6 calculates the directions of arrival of signals from two or more stationary targets and estimates the azimuth of each target (see step 106 in FIG. 4).

As described above, in the FMCW radar device 1 using array extension, the extension signal of the virtual antenna element constituting the element $R_{ij}$ of the extended correlation matrix $R_{xx}$ by using the Khari-Rao product has a cross-correlation component between reception signals, which is in a frame in Expression (10). The cross-correlation component is represented by an exponential function and as the extension signal $R_{21}$ illustrated in Expression (10) in which the base is e and the exponent contains the absolute phases α1 and α2 of the targets a and b. In general, based on the targets a and b whose positions are to be determined being stationary, the absolute phases α1 and α2 of the targets a and b do not change, and the cross-correlation component between reception signals maintains a constant value. It is therefore difficult to identify the targets a and b and identify the azimuth of each target.

According to the FMCW radar device 1 of the embodiment, the vibration applying structure as illustrated in FIG. 3 irregularly applies, to the radar module 11, vibration with a magnitude smaller than the range resolution of the radar device 1, so that the distance R between the radar device 1 and each of the stationary targets a and b fluctuates irregularly. The radar module 11 being vibrating is equivalent to the targets a and b being vibrating when viewed from the radar device 1, that is, equivalent to the distance R being varied. On the other hand, the absolute phases α1 and α2 of the targets a and b are proportional to the distance R between the radar device 1 and the respective targets a and b as represented in the absolute phase α term of Expression (4). Based on the radar device 1 transmitting and receiving positioning signals for several times while the vibration applying structure is applying vibration irregularly to the radar module 11 with a magnitude smaller than the range resolution of the radar device 1, the absolute phases α1 and α2 of the targets a and b change randomly at each measurement.

The cross-correlation component that is contained in the extension signal $R_{21}$ obtained at each measurement and is represented as Expression (10) by the exponential function therefore has varying values. By averaging the obtained extension signals $R_{21}$, therefore, the cross-correlation component converges to the origin in a complex plane to be canceled. The FMCW radar device 1 is able to identify the stationary targets a and b located in similar positions and measure the azimuth of each of the targets a and b with a high degree of accuracy without being affected by the cross-correlation component between reception signals.

In the embodiment, vibration generated by the vibrator 13 is actively applied to the radar module 11 irregularly in particular. The distance R between the radar device 1 and each of the stationary targets a and b thereby reliably fluctuates irregularly, so that the absolute phases α1 and α2 of the targets a and b reliably change randomly at each measurement. It is therefore possible to provide the FMCW radar device 1, which is able to reliably identify the two stationary targets a and b or three or more targets not-illustrated that are located in similar positions and reliably measure the azimuth of each target with a high degree of accuracy without being affected by the cross-correlation component between reception signals.

Furthermore, based on the vehicle 7 being configured to include the FMCW radar device 1 like the embodiment, it is possible to provide the vehicle 7, which is able to identify two or more stationary targets located in similar positions through the FMCW radar device 1 and measure the azimuth of each target with a high degree of accuracy without being affected by the cross-correlation component between reception signals. Herein, the two or more stationary targets are, for example, a bollard 17, a ground 18, and a person 19 that are stationary at a same distance R=R0 to the vehicle 7 as illustrated in FIG. 2.

Still furthermore, the vibration applied to the radar module 11 is limited to a magnitude smaller than the range resolution of the radar device 1. This can prevent the IF signal frequency from appearing to change due to excessively large displacement by the vibration applied to the radar module 11. In the case of a millimeter-wave radar, displacement normally within several centimeters is smaller than the radar range resolution. In order to provide sufficient effects, vibration of a magnitude comparable to about half (approximately 0.5λ) of a wavelength λ of a radar transmission wave is sufficient as the vibration applied to the radar module 11.

In order to confirm the aforementioned effects of the FMCW radar device 1 according to the embodiment, simulation was performed to compare angle estimation error in the case where vibration was applied to the radar module 11 through the vibrator 13 with that in the case where no vibration was applied to the radar module 11.

Figure 7:
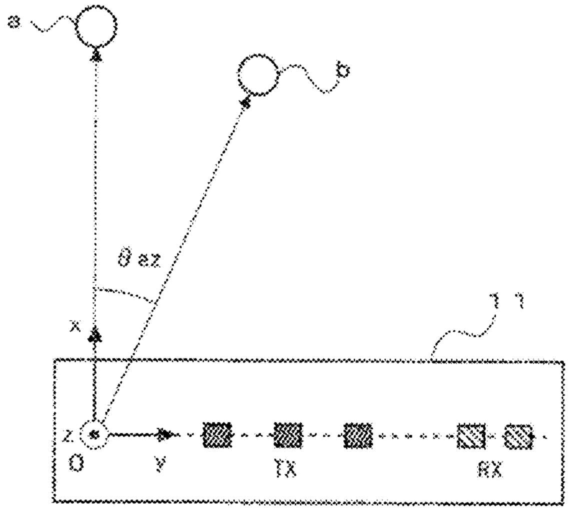
FIG. 7 is a diagram describing simulation performed for confirming the effect of the radar device according to the embodiment.

In this simulation, as illustrated in FIG. 7, the target a, between the two stationary targets a and b, was fixed in front of the radar device 1, and an angular difference $\theta_{az}$ between the target a and the other target b was varied. The simulation was performed for angle estimation error in terms of the azimuth direction (the angular direction on the x-y plane where the x-axis direction is set to 0°) under simulation parameters shown in Table 1 below by using root mean squared error (RMSE) as the evaluation index.

TABLE 1

| | |
|---|---|
| TX coordinate (y direction) | 0.5λ, 1.5λ, 2.5λ |
| RX coordinate (y direction) | 3.5λ, 4.0λ |
| Center frequency | 79 GHz |
| Band width | 4 GHz |
| Sampling frequency | 2.75 MHz |
| Number of sampling points | 128 |
| Number of transmitted chirps | 4, 8, 16 |
| SNR | 20 dB |
| Angle estimation method | Annihilating filter |

Based on x, y, and z coordinates being defined as illustrated in FIG. 7, the coordinates of the transmission antenna TX of the radar module 11 in the y direction were set to positions of 0.5λ, 1.5λ, and 2.5λ where λ is the wavelength of the transmission wave, and the coordinates of the reception antennas RX were set to positions of 3.5λ and 4.0λ. The transmission center frequency of the transmission wave was 79 [GHz], and the band width BW was 4 [GHz]. The IF signal sampling frequency at the ADCs 5 was 2.75 [MHz], and the number of sampling points was 128. The number of transmitted chirps of the chirp signal Ca was set to 4, 8, and 16. The ratio SNR of signal to thermal noise was 20 [dB]. The angle estimation method was the annihilating filter (AF) method.

The vibration applied to the radar module 11 is represented by adding random numbers generated in a certain range to x-, y-, and z-coordinates illustrated in FIG. 7. This is equivalent to applying irregular vibration to the radar module 11. In the specification, the irregular vibration to be applied to the radar module 11 by the vibration applying structure should change the position of the radar module 11 on the x-axis, y-axis, z-axis, x-y plane, x-z plane, y-z plane, or x-y-z space that are illustrated in FIG. 7. In addition, fluctuations irregularly caused in the distance between the FMCW radar device 1 and each of two or more stationary targets by the vibration irregularly applied to the radar module 11 does not need to always change at each measurement of the target's position.

Figure 8:
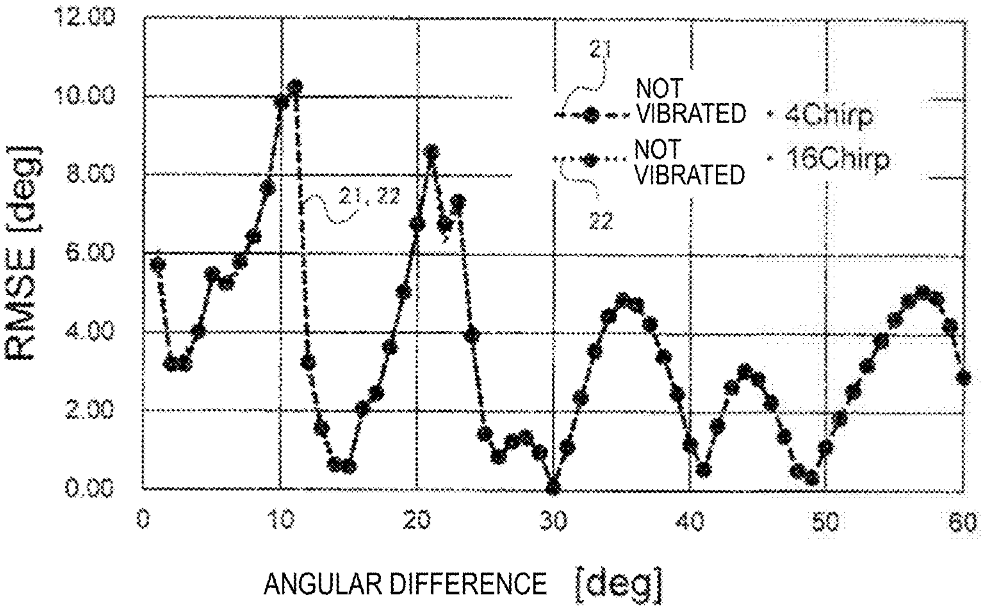
FIG. 8 is a graph illustrating the result of simulation in FIG. 7 performed with no vibration applied to a radar module constituting the radar device according to the embodiment.

FIG. 8 is a graph illustrating the result of the aforementioned simulation performed for 4 and 16 transmitted chirps with no vibration applied to the radar module 11 to obtain angle estimation error of the angular difference $\theta_{az}$. The horizontal axis of the graph represents the angular difference $\theta_{az}$ [deg] between the targets b and a, and the vertical axis represents the RMSE [deg]. A characteristic line 21 indicated by a long-dashed line represents the angle estimation error for 4 transmitted chirps, and a characteristic line 22 indicated by a short-dashed line represents the angle estimation error for 16 transmitted chirps. In the graph, the characteristic lines 21 and 22 overlap each other. The characteristic line 22 is under the characteristic line 21 and is almost invisible.

As understood from the graph in FIG. 8, the RMSE is as large as about 10 [deg] at some array extension angles, and the error is large. Furthermore, as understood from the principle of array extension, there is no difference in the error between the result for 4 transmitted chirps and the result for 16 transmitted chirps, and the angle estimation accuracy cannot improve even if the number of transmissions and receptions of the chirp signal Ca is increased.

Figure 9:
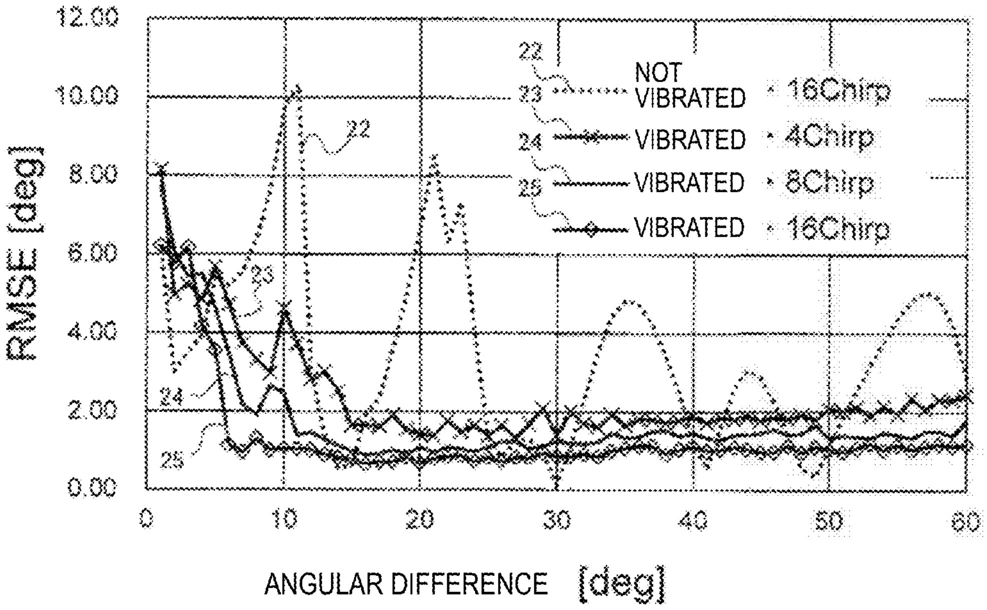
FIG. 9 is a graph illustrating the result of simulation in FIG. 7 performed with vibration applied to the radar module constituting the radar device according to the embodiment.

FIG. 9 is a graph illustrating the result of the aforementioned simulation performed for 4, 8, and 16 transmitted chirps with irregular vibrations applied to the radar module 11 in the x-, y-, and z-coordinate directions to obtain angle estimation error of the angular difference $\theta_{az}$. FIG. 9 also illustrates the characteristic line 22 for 16 transmitted chirps with no vibration, which is illustrated in FIG. 8. The horizontal and vertical axes of the graph are the same as those of the graph illustrated in FIG. 8. A characteristic line 23 indicated by a solid line with x makers represents angle estimation error for 4 transmitted chirps; a characteristic line 24 indicated by only a solid line represents angle estimation error for 8 transmitted chirps; and a characteristic line 25 indicated by a solid line with ◇ markers represents angle estimation error for 16 transmitted chirps.

As revealed by the graph in FIG. 9, based on an irregular vibration being applied to the radar module 11, compared to the case where no vibration is applied to the radar module 11, the RSME has low values over a wide range of angular difference, and fluctuations in angle estimation error are reduced. This is considered to be because based on the positions of the targets a and b slightly changing, random changes in the absolute phases α thereof cancel the correlation component between reception signals as represented in Expression (10). Furthermore, in proportion to the increasing number of transmitted chirps, the RSME value decreases, and the angle estimation accuracy improves. It is therefore understood that the correlation component between reception signals can be canceled more efficiently based on the absolute phases α of the targets a and b changing more randomly.

Figure 10:
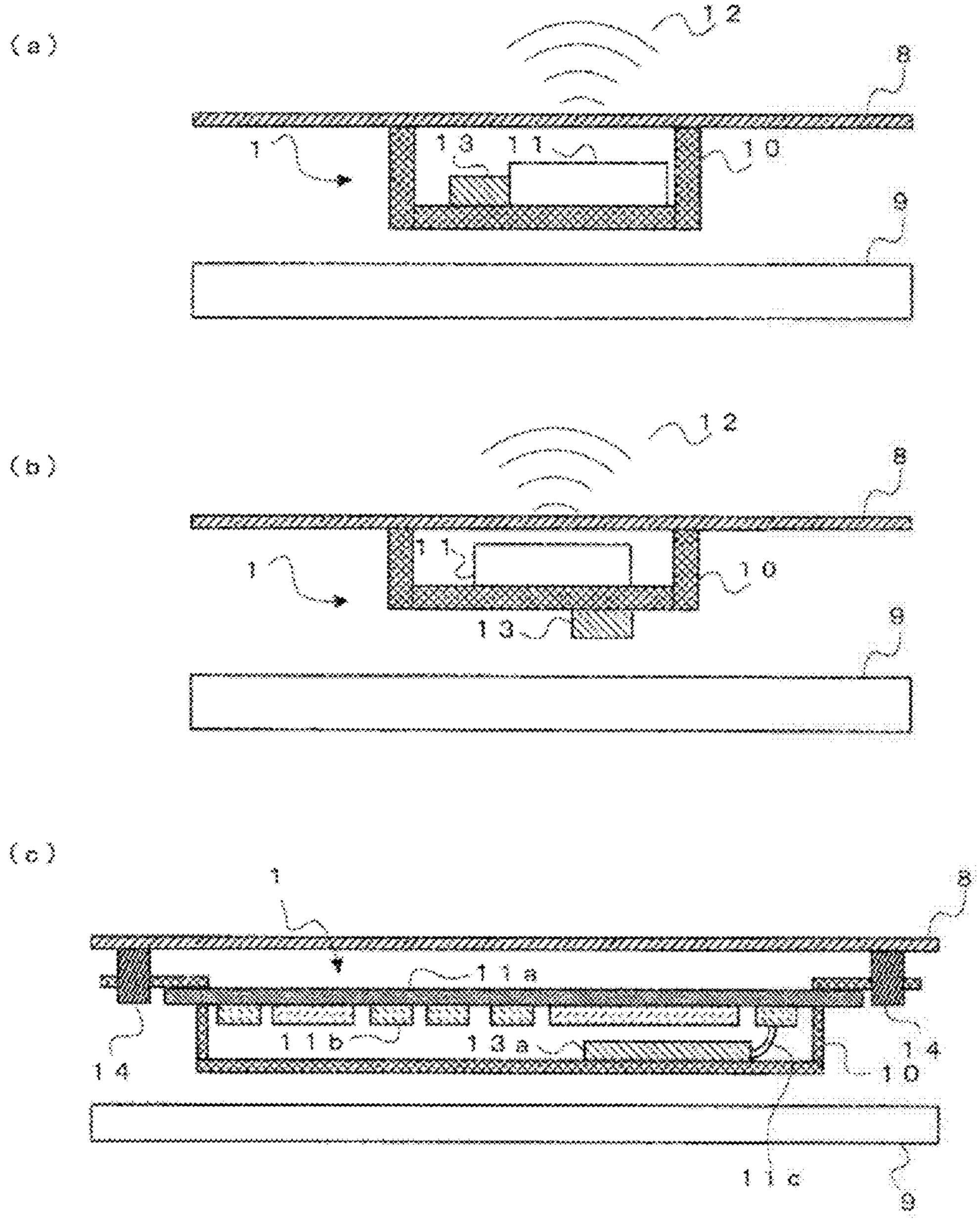
FIG. 10 is a diagram describing modifications of the vibration applying structure constituting the radar device according to the embodiment.

The description of the aforementioned embodiment is given of the case where the vibration applying structure is constructed on the bracket 9 behind the exterior 8 of the vehicle body such that the radar module 11 is mounted on the shield case 10 together with the vibrator 13 as illustrated in FIG. 3. However, as illustrated in FIG. 10, the vibration applying structure may be configured such that the shield case 10 on which the radar module 11 is mounted together with the vibrator 13 is installed on the back side of the exterior 8 of the vehicle body. In FIG. 10, the same or corresponding portions to those in FIG. 3 are given the same reference symbols, and the description thereof is omitted.

Figure 11:
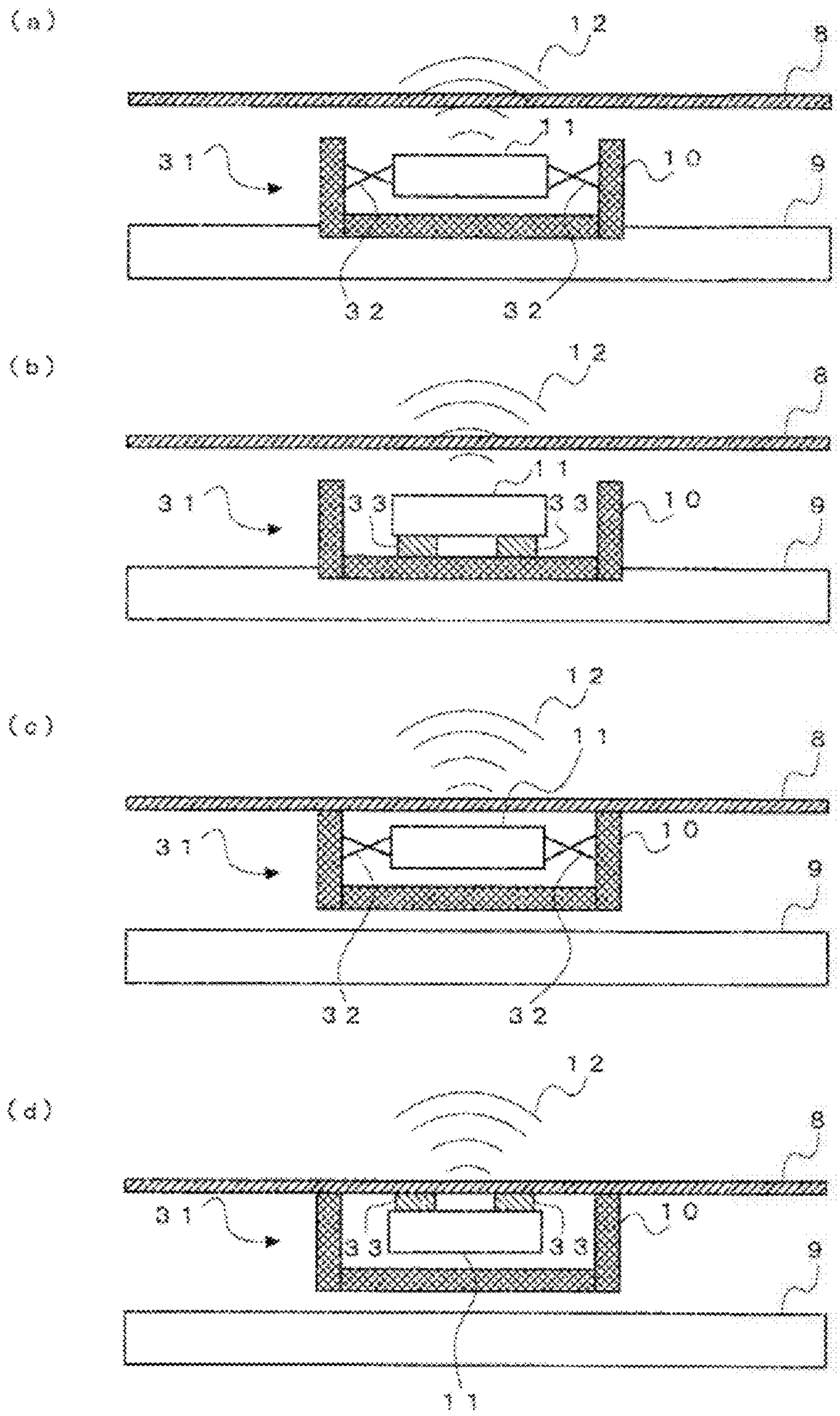
FIG. 11 is a diagram describing a vibration applying structure constituting a radar device according to another embodiment of the present disclosure.

FIG. 11 is a diagram conceptually illustrating a vibration applying structure constituting an FMCW radar device 31 according to another embodiment of the present disclosure. In FIG. 11, the same or corresponding portions to those in FIG. 3 is given the same reference symbols, and the description thereof is omitted.

The FMCW radar device 31 according to the other embodiment is different from the FMCW radar device 1 according to the aforementioned embodiment in that the vibration applying structure is different from the vibration applying structures of the FMCW radar device 1 according to the aforementioned embodiment, which are illustrated in FIGS. 3 and 10. The other configuration is the same as that of the FMCW radar device 1 according to the aforementioned embodiment.

In the vibration applying structure of the FMCW radar device 31 illustrated in FIG. 11(*a*), the shield case 10 is installed on the bracket 9, and suspensions 32, which support the radar module 11 on the shield case 10, amplify vibration caused in the vehicle body of the vehicle 7 based on its engine idling and irregularly transmit the amplified vibration to the radar module 11. In the vibration applying structure of the FMCW radar device 31 illustrated in FIG. 11(*b*), the shield case 10 is installed on the bracket 9, and cushions 33, which support the radar module 11 on the shield case 10, amplify vibration caused in the vehicle body of the vehicle 7 based on its engine idling and irregularly transmit the amplified vibration to the radar module 11.

In the vibration applying structure of the FMCW radar device 31 illustrated in FIG. 11(*c*), the shield case 10 is installed on the back side of the exterior 8 of the vehicle body, and the suspensions 32, which support the radar module 11 on the shield case 10, amplify vibration caused in the vehicle body of the vehicle 7 based on its engine idling and irregularly transmit the amplified vibration to the radar module 11. In the vibration applying structure of the FMCW radar device 31 illustrated in FIG. 11(*d*), the shield case 10 is installed on the back side of the exterior 8 of the vehicle body so as to surround the radar module 11, and the cushions 33, which support the radar module 11 on the back side of the exterior 8 of the vehicle body, amplify vibration caused in the vehicle body of the vehicle 7 based on its engine idling and irregularly transmit the amplified vibration to the radar module 11.

The suspensions 32 and cushions 33 (for example, a shock absorber, rubber, a gel material, or the like), which constitute elastic bodies in these vibration applying structures, have such a spring constant as an elastic constant to amplify vibration caused in the vehicle body based on the engine being included in the vehicle 7 with the radar device 31 mounted thereon is idling and to prevent resonance at a certain frequency. Each of the vibration applying structures illustrated in FIG. 11 includes either the suspensions 32 or the cushions 33 as the elastic bodies. However, the vibration applying structure may be configured to include both the suspensions 32 and the cushions 33.

With the FMCW radar device 31 according to the other embodiment, vibration caused in the vehicle body of the vehicle 7 based on its engine idling is amplified by the elastic constant of the suspensions 32 or cushions 33 and is then passively irregularly applied to the radar module 11, which is supported by the suspensions 32 or cushions 33. Due to this vibration, the distance R between the radar device 31 and each of two or more stationary targets fluctuates irregularly, and the absolute phase α changes randomly at each measurement.

In a similar manner to the FMCW radar device 1 according to the embodiment, it is possible to inexpensively provide the FMCW radar device 31, which is able to identify two or more stationary targets located in similar positions and measure the azimuth of each target with a high degree of accuracy without being affected by the cross-correlation component between reception signals. Furthermore, it is possible to provide the vehicle 7, which is able to identify two or more stationary targets located in similar positions through the FMCW radar device 31 and measure the azimuth of each target with a high degree of accuracy without being affected by the cross-correlation component between reception signals.

In the description of the aforementioned embodiments, the array antenna 3 includes a single transmission antenna Tx and a plurality of reception antennas Rx. However, the array antenna 3 may be configured to include one or more transmission antennas Tx and two or more reception antennas Rx. Such a configuration can exert the same operation effects as the aforementioned embodiments.

In the aforementioned embodiments, the vibration applying structure is preferably configured to cause vibration in the direction of arrival of a reception signal that was transmitted from the radar module 11 and was reflected back off a target.

For example, as illustrated in FIG. 2, based on there being a target on a side of the vehicle 7 and the reception signal arrives at the radar module 11 from the side of the vehicle 7, the vibration applying structure composed of the vibrator 13, the suspensions 32, the cushions 33, or the like is preferably a structure that is provided within the side door 7*a* of the vehicle 7, within the door handle, or in another proper place and generates vibration in the lateral direction of the vehicle 7. Based on there being a target ahead of or behind the vehicle 7 and the reception signal arrives at the radar module 11 from ahead of or behind the vehicle 7, the vibration applying structure is preferably a structure that is provided behind the emblem 7*b*, behind the grille, within the back door, within the door handle, or in another proper place and generates vibration in the longitudinal direction of the vehicle 7.

Based on there being targets ahead of, behind, to the right, and to the left of the vehicle 7 and the reception signals arrive at the radar module 11 from ahead of, behind, the right, and the left of the vehicle 7, the vibration applying structure may be a structure that is provided behind or within bumpers that are installed in the front, back, right, and left sides of the vehicle 7. In this case, the vibration applying structure is configured to generate vibration in the longitudinal direction of the vehicle 7 and in the lateral direction of the vehicle 7. The longitudinal direction of the vehicle 7 is a direction perpendicular to bumpers installed in the front and back sides of the vehicle 7 in plan view of the vehicle 7. The lateral direction is a direction perpendicular to bumpers fitted in the right and left sides of the vehicle 7 in plan view of the vehicle 7.

Based on vibration being caused in the longitudinal or lateral direction of the vehicle 7 in such a manner, the distance R between the radar module 11 and each target varies largely, and the azimuth of each target can be measured with a higher degree of accuracy as described below.

Figure 12:
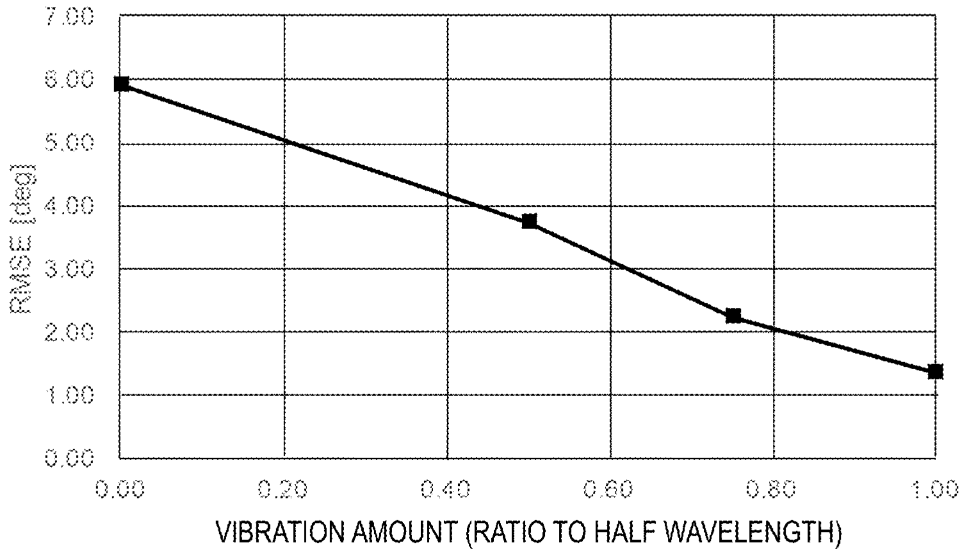
FIG. 12 is a graph illustrating the result of simulation for error in target angle estimation by a radar module constituting the radar device according to the embodiment or the other embodiment.

The graph illustrated in FIG. 12 is a graph representing the result of simulation for error of target's angle estimation by the radar module 11 in a situation where the distance between the radar module 11 and the target is fluctuating slightly.

This simulation was performed where the target a, between the two stationary targets a and b, was fixed in front of the radar device 1 and the angular difference θaz between the target a and the other target b was set to 5 [deg] as illustrated in FIG. 7. Vibrations applied to the radar module 11 in the x-, y-, and z-coordinate directions were uniformly distributed in a similar manner to the aforementioned simulations. Herein, the amount from the lower limit of the vibration and the upper limit thereof is defined as a vibration amount.

The horizontal axis of the graph represents vibration amount by the vibration applying structure, and the vertical axis represents RMSE [deg]. The vibration amount on the horizontal axis is represented as its ratio to the half (0.5λ) of the transmission wavelength λ of the transmission wave from the radar module 11. The ratio is expressed as D/(0.5λ) where D is the magnitude of the vibration amount of the radar module 11.

The graph in FIG. 12 represents that the RMSE (root mean squared error of estimation accuracy) monotonically decreases as the vibration amount applied to the radar module 11 increases in magnitude. The vibration applied to the radar module 11 corresponds to the variation in the distance R between the radar module 11 and the target. The graph in FIG. 12 reveals that the RMSE, that is, angle estimation error decreases as the variation in the distance R between the radar module 11 and the target increases. This means that based on the vibration applying structure being configured to generate large vibration in the direction of arrival of a reception signal that was reflected back off a target, the azimuth of each target can be measured with a high degree of accuracy.

Figure 13:
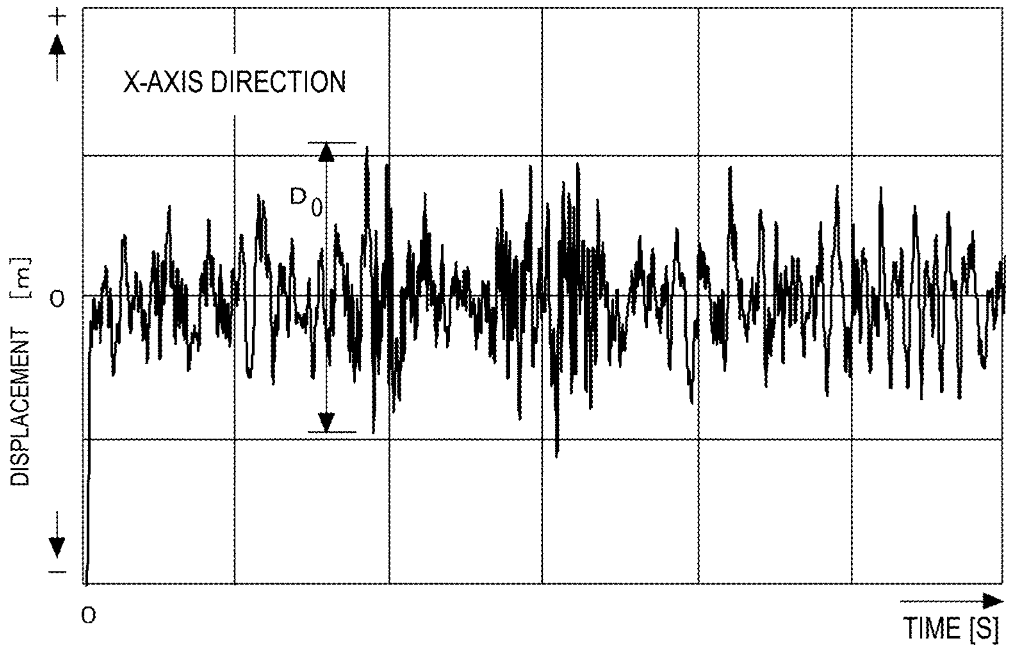
FIG. 13 is a graph illustrating changes with time in vibration in the x-axis direction of a stopped vehicle.
Figure 14:
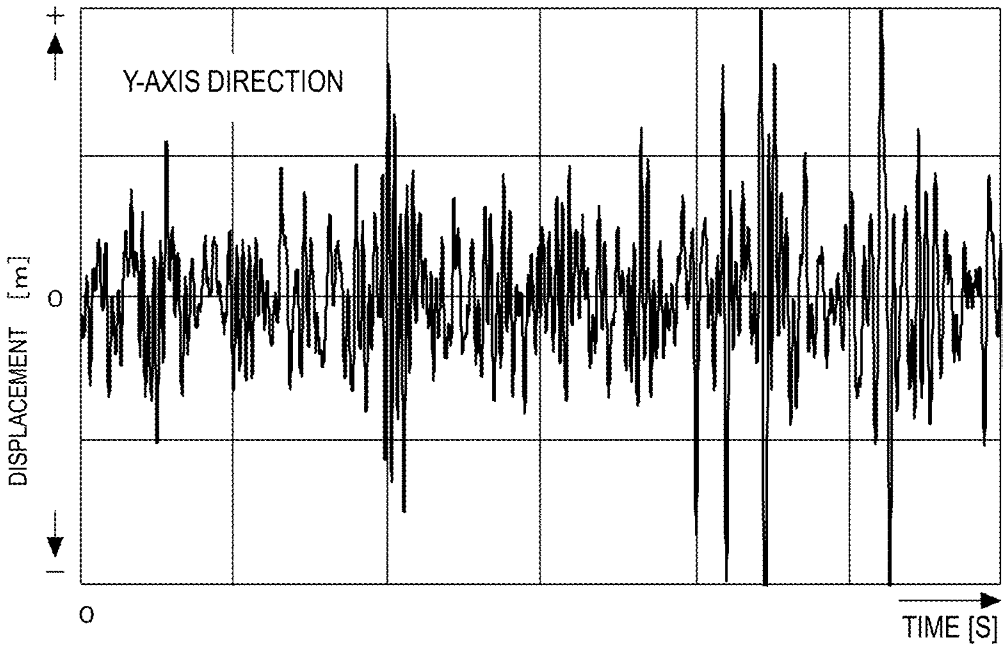
FIG. 14 includes a graph illustrating changes with time in vibration in the y-axis direction of the stopped vehicle and a graph illustrating changes with time in vibration in the z-axis direction of the stopped vehicle.
Figure 14:
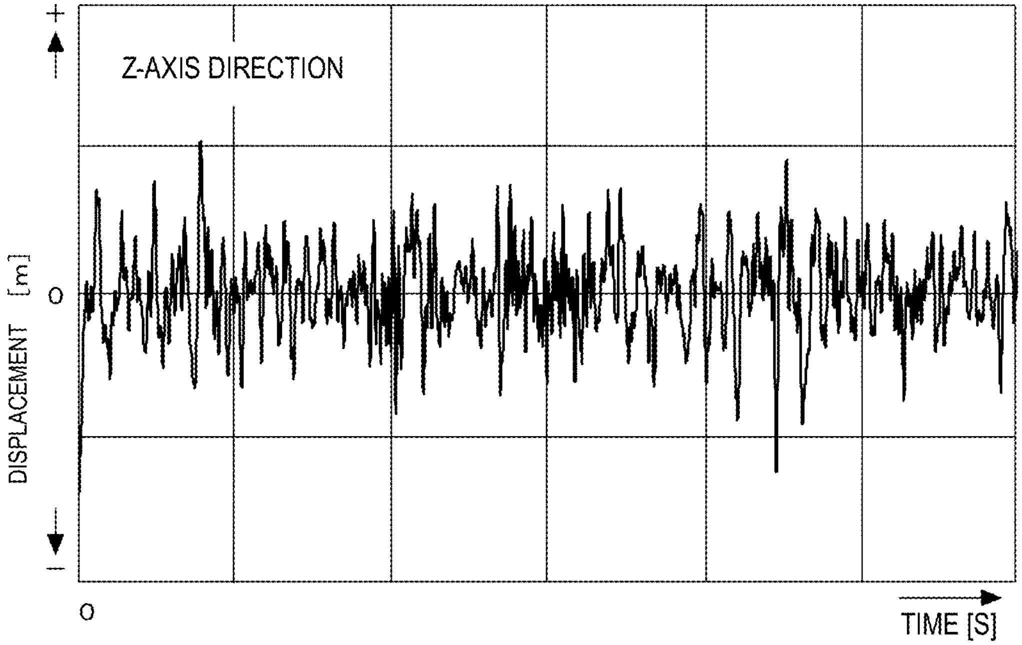

Graphs in FIGS. 13, 14(*a*) and 14(*b*) illustrate changes with time in vibration of a stopped vehicle. The horizontal axis of the graphs is time, and the vertical axis is displacement of the vehicle body due to vibration. The engine of the vehicle, which is a hybrid vehicle, is running, and the vehicle body is slightly vibrating. The displacements of the vibration in the x-, y-, and z-coordinate directions are calculated by measuring acceleration with a six-axis acceleration sensor fixed and fitted within the vehicle compartment and integrating the measured acceleration twice. The x, y, and z coordinates are the same as those illustrated in FIG. 7. The angular direction on the x-y plane where the x-axis direction is 0° is the azimuth direction, and the direction perpendicular to the x-y plane is the z direction.

The graph illustrated in FIG. 13 illustrates the displacement of the vehicle body in the x-axis direction, or in the vehicle's longitudinal direction, that is calculated from the aforementioned measurement. The graph illustrated in FIG. 14(*a*) illustrates the displacement of the vehicle body in the y-axis direction, or in the vehicle's lateral direction, that is calculated from the aforementioned measurement. The graph illustrated in FIG. 14(*b*) illustrates the displacement of the vehicle body in the z-axis direction, or in the vehicle's vertical direction, that is calculated from the aforementioned measurement. The vibration of the vehicle body includes swinging in the x-, y-, and z-axis directions over time around a displacement of 0, both in the positive and negative directions.

In a frequency band from 77 [GHz] to 81 [GHz], for example, in FIG. 13, displacement width (=vibration amount) $D_0$ is about 1 [mm] even at the moment the vibration of the vehicle body in the x-axis direction is maximized. On the other hand, the FMCW radar device has a range resolution Δd of at least 3.75 [cm] for the frequency band from 77 [GHz] to 81 [GHz], for example. For example, the range resolution Δd is expressed as c/(2BW) where c is the speed of light [m/s] and BW is the band width [Hz]. The band width BW of the frequency band from 77 [GHz] to 81 [GHz] is 4 [GHz]. The range resolution Δd is therefore 3.75 [cm] as represented by Expression (11) below.

$$\Delta d = c/(2BW) = (3\times10^8)/(2\times4\times10^9) = 3.75 \tag{11}$$

It is therefore understood that the body vibration amount $D_0$=1 [mm] of the stopped vehicle is extremely smaller than 3.75 [cm] as the range resolution Δd. Furthermore, the body vibration amount $D_0$=1 [mm] of the stopped vehicle is smaller than 0.5λ. Therefore, the cross-correlation component that is contained in the extension signal $R_{21}$ obtained by each measurement and is represented as Expression (10) by an exponential function cannot be canceled even by using the body vibration of the stopped vehicle. On the other hand, the vibration applying structure of each embodiment described above applies, to the radar module 11, vibration with a magnitude not smaller than $D_0/(0.5\lambda)$ and smaller than the range resolution Δd of the radar module 11. The cross-correlation component represented as Expression (10) by the exponential function can be thereby canceled, so that the effects of the aforementioned embodiments can be reliably exerted.

By applying, to the radar module 11, vibration with a magnitude not smaller than $D_0/(0.5\lambda)$ and smaller than the range resolution Δd of the radar module 11, the vibration applying structure of each embodiment described above is able to selectively apply larger and more random vibration than in the case where the vibration of the vehicle itself is involved. This can reliably provide the effect of improving the angle estimation accuracy.

INDUSTRIAL APPLICABILITY

In the description of each embodiment above, the FMCW radar device 1 or 31 is applied to a vehicle. The FMCW radar device 1 or 31 can be also applied to a parked airplane, a stopped ship, or the like in a similar manner. The same operation effects can be exerted even in such a case.

REFERENCE SIGNS LIST

1, 31 FMCW Radar Device
2 RF Signal Generator
3 Array Antenna
Tx Transmission Antenna
Rx(1), . . . , Rx(M−1), Rx(M) Reception Antenna
4 Mixer
5 ADC
6 Calculator
7 Vehicle
8 Exterior of Vehicle 7
9 Bracket
10 Shield Case
11 Radar Module
11*a* Circuit Board
11*b* Electronic Component
11*c* Cable
12 Transmission Wave
13 Vibrator
13*a* Linear Resonance Actuator (Vibrator)
14 Fixing Portion
32 Suspension (Elastic Body)
33 Cushion (Elastic Body)

The invention claimed is:

1. A radar device, comprising:

a radar module including:
- a high-frequency signal generator that generates, as a transmission signal, a chirp signal with a signal frequency varying with time,
- an array antenna including at least one transmission antenna transmitting the transmission signal and a plurality of reception antennas each receiving a reception signal that results from reflection of the transmission signal off a target and returns to the array antenna,
- a mixer multiplying the transmission signal to be transmitted from the transmission antenna and the reception signal received by each of the reception antennas to generate an intermediate frequency signal,
- an AD converter converting the intermediate frequency signal from an analog signal to a digital signal, and
- a calculator that virtually increases number of the reception antennas through array extension using an extended correlation matrix based on the intermediate frequency signal and calculates directions of arrival of the reception signals from two or more stationary targets; and a vibration applying structure that irregularly applies, to the radar module, vibration with a magnitude smaller than range resolution of the radar module, wherein the vibration is configured to cause the distance to the target to fluctuate irregularly and the absolute phase of the target to change randomly to cancel mutual-correlation components between the received signals.

2. The radar device according to claim 1, wherein the calculator generates a correlation matrix based on the intermediate frequency signal acquired for each of the reception antennas and generates the extended correlation matrix by using the Khatri-Rao product using the generated correlation matrix.

3. The radar device according to claim 2, wherein the vibration applying structure irregularly applies vibration generated by a vibrator to the radar module.

4. The radar device according to claim 3, wherein the vibrator is a linear resonance actuator.

5. A radar device, comprising:

a radar module including:

a high-frequency signal generator that generates, as a transmission signal, a chirp signal with a signal frequency varying with time, an array antenna including at least one transmission antenna transmitting the transmission signal and a plurality of reception antennas each receiving a reception signal that results from reflection of the transmission signal off a target and returns to the array antenna, a mixer multiplying the transmission signal to be transmitted from the transmission antenna and the reception signal received by each of the reception antennas to generate an intermediate frequency signal, an AD converter converting the intermediate frequency signal from an analog signal to a digital signal, and a calculator that virtually increases number of the reception antennas through array extension using an extended correlation matrix based on the intermediate frequency signal and calculates directions of arrival of the reception signals from two or more stationary targets; and a vibration applying structure that irregularly applies, to the radar module, vibration with a magnitude smaller than range resolution of the radar module, wherein the vibration applying structure includes an elastic body supporting the radar module and having an elastic constant to amplify vibration caused in a vehicle body of a vehicle in which the radar device is mounted, based on an engine included in the vehicle idling, and the elastic body amplifies the vibration caused in the vehicle body and irregularly transmits the amplified vibration to the radar module.

6. The radar device according to claim 5, wherein the elastic body is a suspension.

7. The radar device according to claim 6, wherein the elastic body is rubber.

8. A vehicle comprising the radar device according to claim 1.

9. The vehicle according to claim 8, wherein the radar device is provided within a door.

10. The vehicle according to claim 8, wherein the radar device is provided behind an emblem.

11. The vehicle according to claim 8, wherein the radar device is provided within a door handle.

12. The vehicle according to claim 8, wherein the radar device is provided behind or within a bumper.

13. The vehicle according to claim 8, wherein the radar device is provided behind a grille.

14. The vehicle according to claim 9, wherein the vibration applying structure causes the vibration in a lateral direction of the vehicle.

15. The vehicle according to claim 13, wherein the vibration applying structure causes the vibration in a longitudinal direction of the vehicle.

16. The vehicle according to claim 12, wherein the vibration applying structure causes the vibration in a direction perpendicular to the bumper in plan view of the vehicle.

17. The vehicle according to claim 11, wherein the vibration applying structure causes the vibration in a lateral direction of the vehicle.

18. The vehicle according to claim 9, wherein the vibration applying structure causes the vibration in a longitudinal direction of the vehicle.

19. The vehicle according to claim 11, wherein the vibration applying structure causes the vibration in a longitudinal direction of the vehicle.

20. The radar device according to claim 1, wherein the vibration applying structure includes an elastic body supporting the radar module and having an elastic constant to amplify vibration caused in a vehicle body of a vehicle in which the radar device is mounted, based on an engine included in the vehicle idling, and the elastic body amplifies the vibration caused in the vehicle body and irregularly transmits the amplified vibration to the radar module.

* * * * *